(12) United States Patent
Song et al.

(10) Patent No.: US 6,526,037 B1
(45) Date of Patent: Feb. 25, 2003

(54) METHOD FOR ALLOCATING SIGNATURE SEQUENCE IN CDMA SYSTEM

(75) Inventors: Iickho Song, Taejon-si (KR); Seong Ill Park, Taejon-si (KR); So Ryoung Park, Taegu-si (KR)

(73) Assignee: Korea Advanced Institute of Science & Technology, Taejon-si (KR)

( * ) Notice: Subject to any disclaimer, the term of this patent is extended or adjusted under 35 U.S.C. 154(b) by 0 days.

(21) Appl. No.: 09/337,597

(22) Filed: Jun. 21, 1999

(30) Foreign Application Priority Data

Jul. 24, 1998 (KR) ............................... 98-29984

(51) Int. Cl.[7] .................................................. H04Q 7/20
(52) U.S. Cl. .................. 370/342; 370/203; 370/441; 370/479; 455/450; 455/452; 455/509
(58) Field of Search ................................ 455/450, 451, 455/452, 509; 370/335, 341, 342, 203, 441, 479; 375/140, 146

(56) References Cited

U.S. PATENT DOCUMENTS

| 5,367,516 | A | * | 11/1994 | Miller | 370/203 |
|---|---|---|---|---|---|
| 5,442,661 | A | * | 8/1995 | Falconer | 370/479 |
| 5,625,642 | A | * | 4/1997 | Wornell | 375/146 |
| 5,742,678 | A | * | 4/1998 | Dent et al. | 370/335 |
| 5,943,330 | A | * | 8/1999 | Hottinen | 370/335 |
| 5,966,409 | A | * | 10/1999 | Maeda et al. | 370/513 |
| 5,991,333 | A | * | 11/1999 | Rice | 370/479 |

* cited by examiner

*Primary Examiner*—William Trost
*Assistant Examiner*—Simon Nguyen
(74) *Attorney, Agent, or Firm*—Bachman & LaPointe, P.C.

(57) ABSTRACT

A method for allocating signature sequence used to distinguish my own signal from the other user's signals in a code division multiple access system comprising the steps of obtaining and selecting a Park-Song sequence based upon a specific equations; allocating the selected Park-Song sequence as the signature sequence to the pertinent user; performing communications using the allocated signature sequence; and generating the signature sequence as the Park-Song sequence added to the beginning and ending 'patches' of itself at both ends.

4 Claims, 5 Drawing Sheets

METHOD FOR ALLOCATING SIGNATURE SEQUENCE IN CDMA SYSTEM

BACKGROUND OF THE INVENTION

1. Field of the Invention

The present invention relates to a method for allocating signature sequence in a CDMA system, and more particularly to a method for allocating signature sequence capable of minimizing interference among users using Park-Song (PS) sequence in a CDMA system.

2. Description of the Prior Art

Generally, a multiple access technique is a method through which a plurality of users send and receive signals at the same time, and is divided into the time division multiple access (TDMA), a frequency division multiple access (FDMA) and the code division multiple access (CDMA).

A primary object of the multiple access is that a plurality of signals do not allow to be overlapped, that is, to be jammed up in cases where a plurality of users give and take signals at the same time.

First, the TDMA of the time dividing method capable of thinking out most easily sends signals in regular time sequence. For example, a system respectively allocates a pertinent number to ten users for ten users. In this case, if any user transmits a signal, the other users interrupt transmission of signals and transmit a signal only in the case of his own order.

Second, the FDMA of the frequency dividing method is the method in which a system allocates frequencies different from each other to each user and sends the signal of the pertinent frequency. For example, a system allocates 0 to 5 kHz to one and 5 to 10 kHz to another so as to allocate different frequency bands to every user for ten users.

As described above, these TDMA and FDMA divide respectively time and frequency and use the results. That is, the TDMA divides time while sharing frequency, on the other hand the FDMA divides frequency while sharing time.

Meanwhile, the CDMA of the code dividing method is the method capable of sharing both time and frequency. Therefore, signals of a plurality of users are overlapped in both areas of time and frequency. A new method of finding out the only signal corresponding to oneself of the signals is required, and thus a system allocates codes to each user to accomplish such object.

In addition, a sequence means a queue of a number such as "1, 0, 0, 1, 1, . . . , 0, 1". That is, the sequence is that the number is continued in accordance with a prescribed rule. Particularly, as mentioned above the sequence consisted of '0' and '1' is called a binary sequence, the most representative binary sequence is PN sequence widely used in the CDMA recently.

The most important characteristics of the sequence is auto-correlation and cross-correlation. The auto-correlation is a characteristics of the case of multiplying and adding one sequence and itself, and the cross-correlation is a characteristics of the case of multiplying and adding one sequence and another. A good sequence satisfies the following matters, in cases where the length of the sequence is N.

auto-correlation=N, cross-correlation=0

Figure 1:
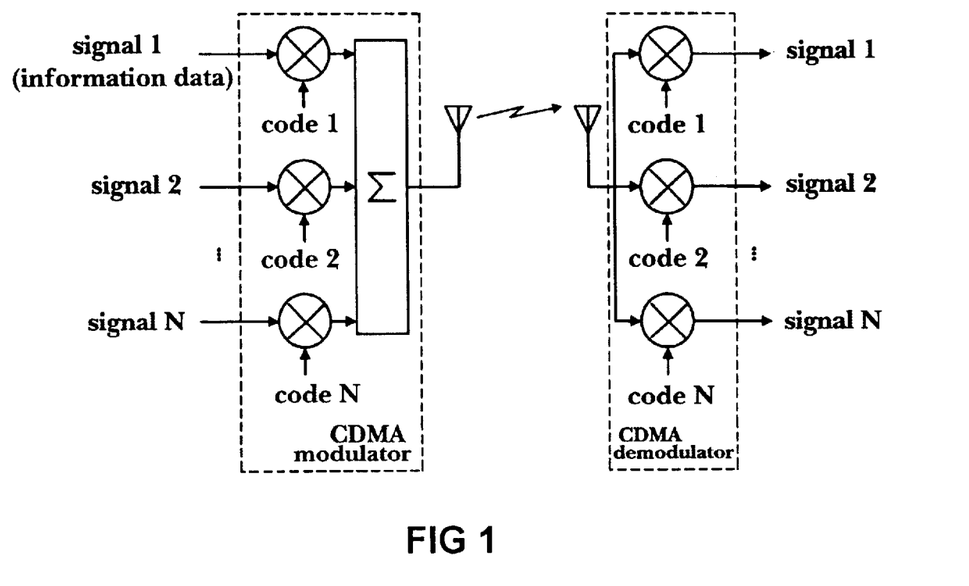
FIG. 1 is a schematic diagram illustrating a code division multiple access system.

Meanwhile, when the system allocates k sequences having the same length to k users, the allocated sequences are called codes. As shown in FIG. 1, sequences multiplied by information data are called a spreading codes or codes in the case of sending the information data from a transmission side. Such codes are differently allocated every users in CDMA system. Thus, the most important characteristics of the CDMA start from auto-correlation and cross-correlation of the different codes. That is, if one hopes to find out a desired signal, namely, information data, the system multiplies the signal by the code of signal sending one. Then, the signal is converted into the original information data, and signals of the other users become zero by the cross-correlation characteristics.

However, there are several problems actually. First, it is difficult to make the cross-correlation zero. Second, if his own signal is arrived a little later in the auto-correlation, the signal must be become zero, but actually the signal is not zero.

Therefore, the present invention suggests a sequence superior to the prior PN sequence in view of the auto-correlation and cross-correlation, and further suggests a method applicable to CDMA.

SUMMARY OF THE INVENTION

Therefore, an object of the present invention is to provide a method for allocating signature sequence in a CDMA system capable of minimizing interference among users using Park-Song sequence of improving auto-correlation and cross-correlation characteristics.

In accordance with the present invention, this object is accomplished by providing a method for allocating signature sequence used to distinguish my own signal from the other user's signals in a code division multiple access system comprising the steps of: obtaining a Park-Song sequence $c_{l,k}$ based upon an equation (1) and selecting the Park-Song sequence based upon an equation (2), $$c_{l,k} = \sum_{p=0}^{N_4-1} W_{N_s}^{lk} W_V^{v_t} W_{N_4^{i2}}^{lp} \delta(R(l+mp, N_b)) = W_{V_s}^{i_s} \quad (1)$$

where, $i_s = Vl(k + Kp_s) + P(\beta_{p_s})N_s$, $V_s = VN_s$, and $p_s$ satisfies $R(l + mp_s, N_b) = 0$, $$a_l^{(k)} = \begin{cases} c_{l+N,-L,k}, & \text{if } l = 0, 1, \ldots, L-1, \\ c_{l-L,k}, & \text{if } l = L, L+1, \ldots, L+N_s-1, \\ c_{l+N,-L,k}, & \text{if } l = L+N_s, L+N_s+1, \ldots, N-1. \end{cases} \quad (2)$$

$$= c_{R(l+N,-L,N_s),k}, l = 0, 1, \ldots, N-1, k = 0, 1, \ldots, K_u - 1.$$

where, L is a natural number chosen based upon the number of resolvable paths and the time delays, $K_u$ is the number of users, and $N=N_s+2L$ is the length of the signature sequence; allocating the selected Park-Song sequence as the signature sequence to the pertinent user; and performing communications using the allocated signature sequence.

BRIEF DESCRIPTION OF THE DRAWINGS

Other objects and aspects of the invention will become apparent from the following description of embodiments with reference to the accompanying drawings in which.

DESCRIPTION OF THE PREFERRED EMBODIMENTS

The objects, characteristics and advantages of the above-described invention will be more clearly understood through the preferable embodiments referring to the attached drawings.

Since the terms mentioned later are judged based upon the function of the present invention and they can be changed according to the technician's intention or a usual practice, the terms should be judged considering the overall contents of the specification of the present invention.

First, a discrete Fourier transform matrix of size N×N with index m is defined as $$F_{N,m} = [W_N^{-klm}] \quad (1)$$

where, m is a natural number, k, l=0, 1, ..., N−1, $W_N = e^{2\pi j/N}$, and $j=\sqrt{-1}$.

In addition, a diagonalized matrix $D(\{x_l\})$ of a sequence $\{x_l\}$ is defined as $$D(\{x_l\}) = \text{diag}(\{x_l\}). \quad (2)$$

Next, when α and q are integers, β is a natural number, and α=qβ+r with r=0, 1, ..., β−1, a quotient function Q and a residual function R are defined as $$Q(\alpha,\beta)=q, \ R(\alpha,\beta)=r. \quad (3)$$

Here, $N_b$ symbols $\beta_i$, i=0, 1, ..., $N_b$−1, all with equal magnitude is called basic complex symbols. At this time, we assume $\beta_i$ are located on the unit circle of the complex plane. For example, $\{W_3^0=1, W_3, W_3^2\}$ is a set of basic complex symbols.

First, an orthogonal sequence is generated from $\{\beta_i\}$. For a set $\{\beta_i\}$ of basic complex symbols and $1 \leq m \leq N_b-1$, a basic orthogonal sequence matrix G of size $N_b \times N_b$ is defined as $$G = F_{nb,m}^{-1} D(\{\beta_i\}). \quad (4)$$

Next, a basic orthogonal sequence $\{g_p\}$ of length $N_b^2$ is defined by $$g_p = G_{Q(p,N_b),R(p,N_b)} \quad (5)$$

$$= \beta_{R(p,N_b)} W_{N_b}^{Q(p,N_b)R(p,N_s)m}, \ p=0, 1, \ldots, N_b^2-1.$$

where, $G_{ab}$ means the ath row, bth column element of G. Using the basic orthogonal sequence $\{g_p\}$, $N_s \times K$ matrix H is made as $$H = [h_{i,k}] \quad (6)$$

where, $$h_{i,k} = \sum_{p=0}^{N_b^2-1} g_p \delta(i-k-pK).$$

$N_s = KN^{22}$, and K is a natural number. The first column of H is composed of $g_0$ followed by K−1 0's, $g_1$ followed by K−1 0's, ..., and $g_{N_b^2-1}$ followed K−1 0's. Other columns of H are shifted vectors of the first column.

Now, a PS sequence matrix C of size $N_s \times K$ is defined as $$C = \frac{1}{N_b} F_{N_s,1}^{-1} H = [c_{l,k}] \quad (7)$$

where, $$c_{l,k} = W_{N_s}^{lk} \sum_{p=0}^{N_b-1} \beta_p W_{N_b^2}^{lp} \delta(R(l+mp, N_b)).$$

At this time, a sequence $\{c_{l,k}, l=0, 1, \ldots, N_s-1\}$ is called the PS sequence. For example, let $\{\beta_i\} = \{1, W_3, W_3^2\}$ $N_b=3$, m=1, and K=2. Then, $$G = \begin{bmatrix} 1 & 1 & 1 \\ 1 & W_3 & W_3^2 \\ 1 & W_3^2 & W_3 \end{bmatrix} \begin{bmatrix} 1 & 0 & 0 \\ 0 & W_3 & 0 \\ 0 & 0 & W_3^2 \end{bmatrix} = \begin{bmatrix} 1 & W_3 & W_3^2 \\ 1 & W_3^2 & W_3 \\ 1 & 1 & 1 \end{bmatrix} \quad (8)$$

and $\{g_p\} = \{1, W_3, W_3^2, W_3, 1, 1, 1,\}$

Then, $$H = \begin{bmatrix} 1 & 0 & W_3 & 0 & W_3^2 & 0 & 1 & 0 & W_3^2 & 0 & W_3 & 0 & 1 & 0 & 1 & 0 & 1 & 0 \\ 0 & 1 & 0 & W_3 & 0 & W_3^2 & 0 & 1 & 0 & W_3^2 & 0 & W_3 & 0 & 1 & 0 & 1 & 0 & 1 \end{bmatrix}^T. \quad (9)$$

Then, the PS sequence matrix C is $$C = \frac{1}{3} F_{18,1}^{-1} H \quad (10)$$

$$= \begin{bmatrix} W_{18}^0 & W_{18}^{16} & W_{18}^{10} & W_{18}^{0} & W_{18}^{10} & W_{18}^{16} & W_{18}^{0} & W_{18}^{4} & W_{18}^{4} \\ W_{18}^0 & W_{18}^{17} & W_{18}^{12} & W_{18}^{3} & W_{18}^{14} & W_{18}^{3} & W_{18}^{6} & W_{18}^{11} & W_{18}^{12} \end{bmatrix}$$

-continued $$\begin{matrix} W_{18}^0 & W_{18}^{16} & W_{18}^{10} & W_{18}^0 & W_{18}^{10} & W_{18}^{16} & W_{18}^0 & W_{18}^4 & W_{18}^4 \\ W_{18}^9 & W_{18}^8 & W_{18}^3 & W_{18}^{12} & W_{18}^5 & W_{18}^{12} & W_{18}^{15} & W_{18}^2 & W_{18}^3 \end{matrix}]^T.$$

Therefore, the PS sequences are $$c_{l,0} = \{W_{18}^0, W_{18}^{16}, W_{18}^{10}, W_{18}^0, W_{18}^{10}, W_{18}^{16}, W_{18}^0, W_{18}^4, W_{18}^4, \quad (11)$$
$$W_{18}^0, W_{18}^{16}, W_{18}^{10}, W_{18}^0, W_{18}^{10}, W_{18}^{16}, W_{18}^0, W_{18}^4, W_{18}^4\},$$

$$c_{l,1} = \{W_{18}^0, W_{18}^{17}, W_{18}^{12}, W_{18}^3, W_{18}^{14}, W_{18}^3, W_{18}^6, W_{18}^{11}, W_{18}^{12},$$
$$W_{18}^9, W_{18}^8, W_{18}^3, W_{18}^{12}, W_{18}^5, W_{18}^{12}, W_{18}^{15}, W_{18}^2, W_{18}^3\}.$$

Next, a simpler generation method than the explained matrix multiplications is introduced when generating the PS sequence.

First we can assume $\beta_p \in \{W_V^i, i=0, 1, \ldots, V-1\}$, where V is a natural number. Consider a function P defined by $P(\beta_p) = v_p$ when $\beta_p = W_V^i$. Then, the $c_{l,k}$ of equation (7) becomes $$c_{l,k} = \sum_{p=0}^{N_b-1} W_{N_s}^{lk} W_V^{v_p} W_{N_b^2}^{lp} \delta(R(l+mp, N_b)) = W_{V_s}^L \quad (12)$$

where, $W_{N_s} = e^{j2\pi/N_s}$, $W_V = e^{j2\pi/V}$, $W_{N_b^2} = e^{j2\pi/N_b^2}$, $W_{V_s} = e^{j2\pi/V_s}$, $N_s = KN_b^2$ is the length of the Park-Song sequence, V is a natural number, $N_b$ is the size of a basic complex symbol, m is a natural number less than $N_b$, $i_s = Vl(k+Kp_s)+P(\beta_{Ps})N_s$, $V_s = VN_s$, K is the maximum number of users, $p_s$ is the number satisfying $R(l+mp_s, N_b)=0$, the function P is defined by $P(\beta_p)=v_p$ when $\beta_p=W_V^{v_p}$, $\delta(\bullet)$ is the Kronecker delta function, $R(a,b)$ is the remainder when a is divided by b, $\beta_p \in \{W_V^i, i=0,1, \ldots, V-1\}$ is a basic complex symbol, $e=2.718\ldots$ is the base of the natural logarithm, and $j=\sqrt{-1}$.

That is, the equation (12) shows that the PS sequence can be obtained by using only integer sums and modular operations. Tables 1 and 2 represent indices of sequences generated when selecting the PS sequence represented in the equation (11) as $V=N_b=3$ in the equation (12).

TABLE 1 k = 0, K = 2, m = 1, $N_b$ = 3, $N_s$ = 18, V = 3

| l | $p_s$ | $R(i_s, N_s)$ | l | $p_s$ | $R(i_s, N_s)$ |
|---|---|---|---|---|---|
| 0 | 0 | 0 | 9 | 0 | 0 |
| 1 | 2 | 16 | 10 | 2 | 16 |
| 2 | 1 | 10 | 11 | 1 | 10 |
| 3 | 0 | 0 | 12 | 0 | 0 |
| 4 | 2 | 10 | 13 | 2 | 10 |
| 5 | 1 | 16 | 14 | 1 | 16 |
| 6 | 0 | 0 | 15 | 0 | 0 |
| 7 | 2 | 4 | 16 | 2 | 4 |
| 8 | 1 | 4 | 17 | 1 | 4 |

TABLE 2 k = 1, K = 2, m = 1, $N_b$ = 3, $N_s$ = 18, V = 3

| l | $p_s$ | $R(i_s, N_s)$ | l | $p_s$ | $R(i_s, N_s)$ |
|---|---|---|---|---|---|
| 0 | 0 | 0 | 9 | 0 | 9 |
| 1 | 2 | 17 | 10 | 2 | 8 |

TABLE 2-continued k = 1, K = 2, m = 1, $N_b$ = 3, $N_s$ = 18, V = 3

| l | $p_s$ | $R(i_s, N_s)$ | l | $p_s$ | $R(i_s, N_s)$ |
|---|---|---|---|---|---|
| 2 | 1 | 12 | 11 | 1 | 3 |
| 3 | 0 | 3 | 12 | 0 | 12 |
| 4 | 2 | 14 | 13 | 2 | 5 |
| 5 | 1 | 3 | 14 | 1 | 12 |
| 6 | 0 | 6 | 15 | 0 | 15 |
| 7 | 2 | 11 | 16 | 2 | 2 |
| 8 | 1 | 12 | 17 | 1 | 3 |

Meanwhile, the auto-correlation function of the PS sequence is $$A(\tau) = \sum_{l=0}^{N_s-1-\tau} c_{l+\tau,k} c_{l,k}^* + \sum_{l=N_s-\tau}^{N_s-1} c_{l+\tau-N_s,k} c_{l,k}^* \quad (13)$$
$$= N_s W_N^{\tau k} \delta(R(\tau, N_b^2)).$$

Figure 2:
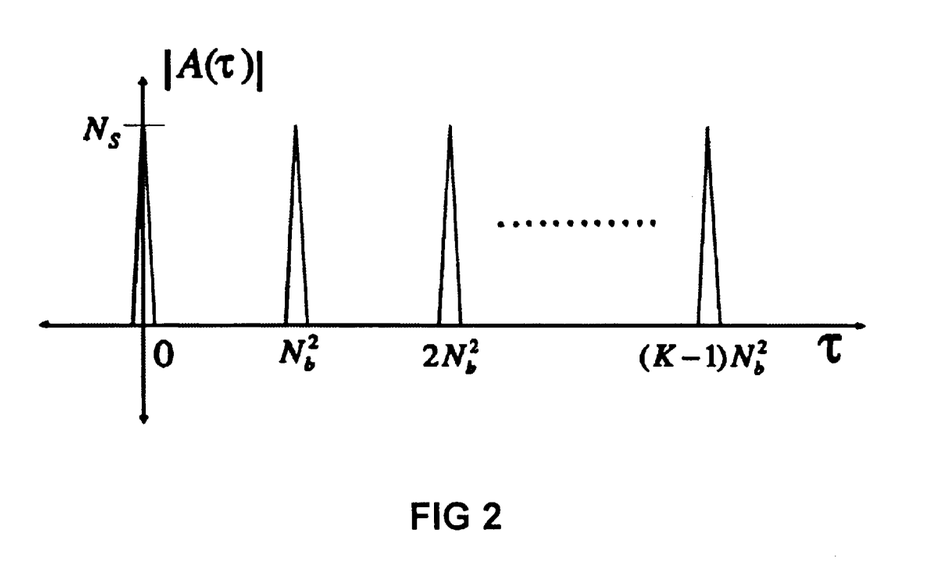
FIG. 2 is a graph illustrating auto-correlation function of Park-Song sequence.

As shown in the equation (13) and FIG. 2, the auto-correlation function has a nonzero value only when $\tau = iN_b^2$, $i=0, 1, \ldots, K-1$: the nonzero interval can be controlled by properly choosing the value of $N_b$.

On the other hand, let us denote two PS sequences as $\{c^I_{l,k}\}$ and $\{c^{II}_{l,k}\}$. Then, the cross-correlation function of the two sequences is $$C(\tau) = \sum_{l=0}^{N_s-1-\tau} c^I_{l+\tau,k} c^{II*}_{l,k} + \sum_{l=N_s-\tau}^{N_s-1} c^I_{l+\tau-N_s,k} c^{II*}_{l,k} \quad (14)$$
$$= KN_b W_{N,}^{\tau k^I} \sum_{p=0}^{N_b-1} \sum_{q=0}^{N_b-1} \beta_p^I \beta_q^{II*} W_{N_b^2}^{\tau p}$$
$$\delta(R(\tau + m^I p - m^{II} q, N_b)) \delta(\{k^I - k^{II} + K(p-q)\}).$$

where, * represents a complex conjugate and the superscripts I and II of k, m and β are used to distinguish the two sequences.

Figure 3:
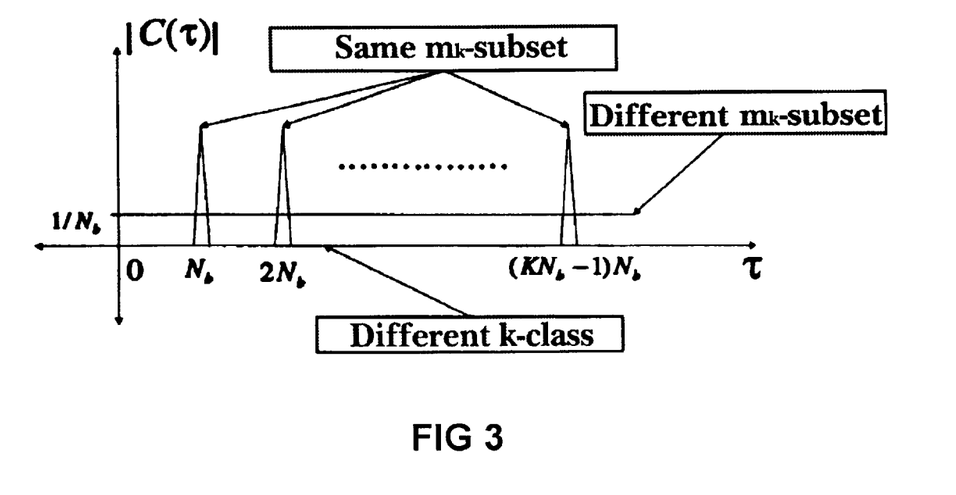
FIG. 3 is a graph illustrating cross-correlation function of Park-Song sequence.

Meanwhile, Table 3 and FIG. 3 show the norlized absolute values of the cross-correlation function for 3 distinct cases.

TABLE 3

Cross-correlation function (normalized absolute values)

| conditions | $\|C(\tau)\|/N_s$, $\tau = 0, 1, \ldots, N_s - 1$ |
|---|---|
| $k^I \neq k^{II}$ | 0 |
| $k^I = k^{II} = k$, $m^I \neq m^{II}$ | $\dfrac{1}{N_b}$ |
| $k^I = k^{II} = k$, $m^I = m^{II}$, $\{\beta^I\} \neq \{\beta^{II}\}$ | $\dfrac{1}{N_b}\left\|\sum_{p=0}^{N_b-1} \beta_p^I \beta_p^{II*} W_{N_b^2}^{cp}\right\| \delta(R(\tau, N_b))$ |

In the first case $k^I \neq k^{II}$, we see the normalized absolute cross-correlation function is 0. In this case, the cross-correlation is independent of the value of the other parameters, m, $\{\beta_i\}$. Next, when $k^I = k^{II} = k$ and $m^I \neq m^{II}$, the absolute value of the normalized cross-correlation function is $1/N_b$. Finally, when $k^I = k^{II} = k$, $m^I = m^{II}$, and $\{\beta_i^I\} \neq \{\beta_i^{II}\}$ (in other words, when only the $\beta_i$'s of two sequence are different), the normalized absolute value of the cross-correlation function is 0 except for $\tau=nN_b$, $n=0, \pm 1, \pm 2, \ldots, \pm(KN_b-1)$. In this case, if we focus on the zero-shifted interval ($\tau=0$) of the cross-correlation, the normalized absolute value can be made to be 0 at $\tau=0$ by choosing $\beta_i$'s satisfy $$\sum_{p=0}^{N_b-1} \beta_p^I \beta_p^{II*} = 0.$$

Next, an $m_k$-subset of the PS sequence is defined as a collection of PS sequences generated with the same values of m and k and the different value of $\{\beta_i\}$, and a k-class of the PS sequence is defined as the collection of $m_k$-subsets having the same value of k. Thus, the explained correlation characteristics are summarized by the following theorems.

Theorem 1. The auto-correlation function of the PS sequence is zero except when the time difference is a multiple of the square of the number of the basic symbols.

Theorem 2. Two PS sequences chosen from different k-classes have no cross-correlation.

Theorem 3. The absolute value of the cross-correlation between two PS sequences chosen from different $m_k$-subsets of a k-class is $1/N_b$.

Theorem 4. IF $$\sum_{p=0}^{N_b-1} \beta_p^I \beta_p^{II*} = 0,$$

the absolute value of the cross-correlation between two PS sequences chosen from the same $m_k$-subset is zero for $\tau=0$ and $iN_b<|\tau|<(i+1)N_b$, $i=1, 2, \ldots, KN_b-2$.

Next, procedures for allocating the signature sequence to the user using the PS sequence in CDMA system are explained.

First, let us assume that there are $K_u$ users in the CDMA system. Then, the PS sequence used as the signature sequence are selected by the following two methods.

Ths first method selects one PS sequence each from different k-classes. Then, $K_u=K$. In addition, the second selection method selects $N_b$ PS sequences satisfying the Theorem 4 each from different k-classes. Then, $K_u=KN_b$.

Since the correlation functions of the PS sequence exhibit periodicity as described above, it is not desirable to use the PS sequence directly as the signature sequence except for perfectly synchronous cases.

Figure 4:
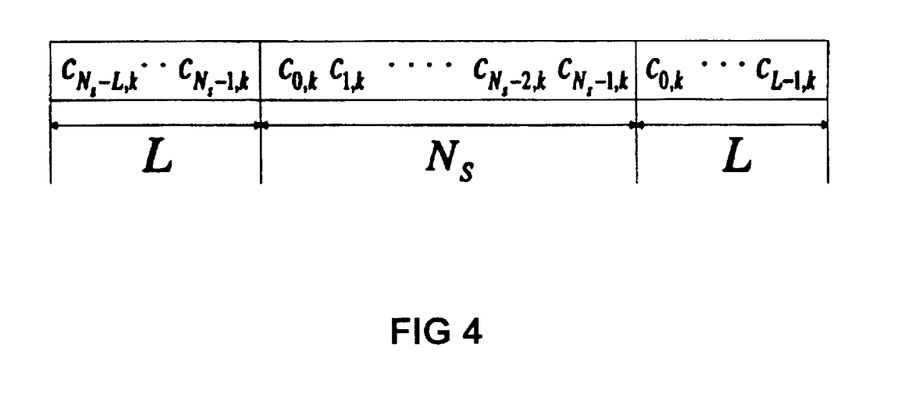
FIG. 4 is a view illustrating signature sequence consisted of Park-Song sequence according to the present invention.
Figure 5:
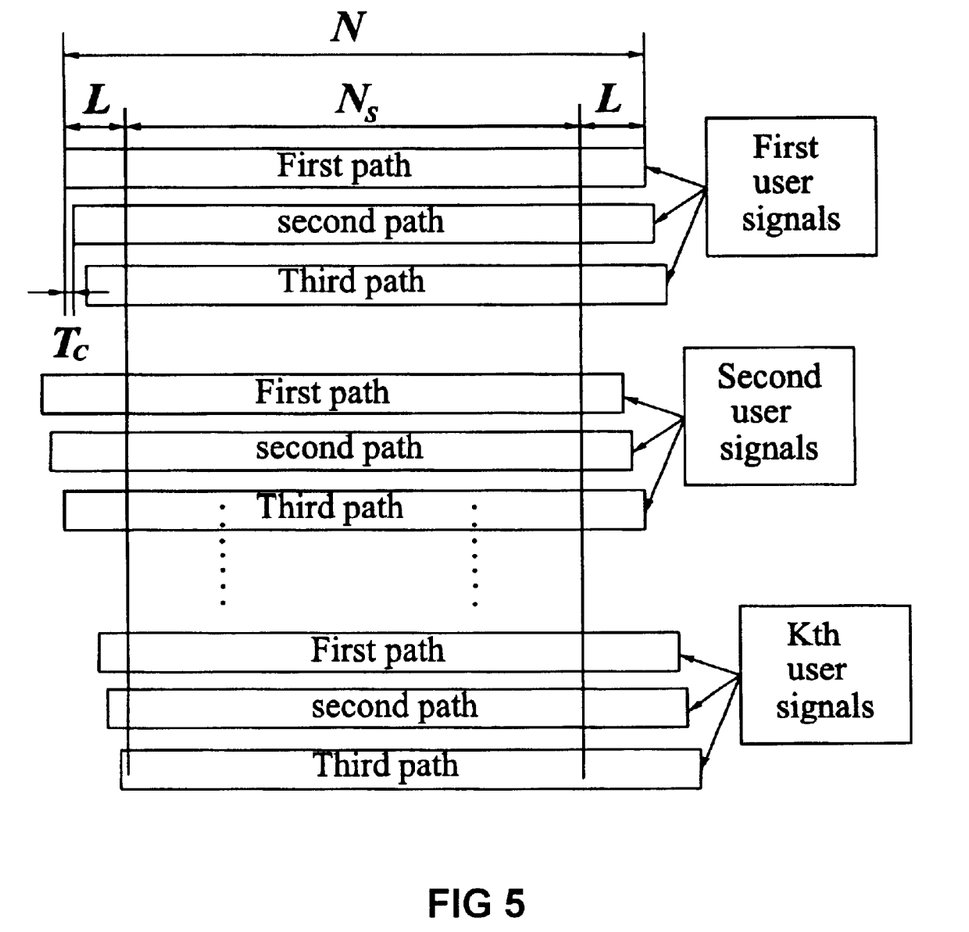
FIG. 5 is a view illustrating a reception signals in a code division multiple access system according to the present invention.

Therefore, a patching method is used for assigning the signature sequence to each user. Particularly, the following signature sequence is assigned to each user for the first selection method.

$$a_L^{(k)} = \begin{cases} c_{l+N_s-L,k}, & \text{if } l = 0, 1, \ldots, L-1, \\ c_{l-L,k}, & \text{if } l = L, L+1, \ldots, L+N_s-1, \\ c_{l+N_s-L,k}, & \text{if } l = L+N_s, L+N_s+1, \ldots, N-1, \end{cases} \quad (15)$$

$$= c_{R(l+N_s-L,N_s),k}, \quad l = 0, 1, \ldots, N-1, \; k = 0, 1, \ldots, K_u-1.$$

where, L is a natural number chosen based upon the number of resolvable paths and time delay of the communication channel, $N=N_s+2L$ is the length of the signature sequence, and $K_u$ is the number of active users in the system. The signature sequence made in accordance with the invention is the PS sequence added to the beginning and ending 'patches' of itself at both ends, as shown in FIG. 4. In this case, in order to fully exploit the excellent correlation properties of the PS sequence, the number L should satisfy $$\min\left\{\left\lfloor \frac{\tau^{(k)}}{T_c} \right\rfloor\right\} \geq -L, \quad k=0, 1, \ldots, K_u-1, \quad (16)$$

$$\max\left\{\left\lceil \frac{\tau^{(k)}}{T_c} \right\rceil + L_p^{(k)}\right\} \leq L, \quad k=0, 1, \ldots, K_u-1, \; L < N_b^2.$$

where, $\lfloor x \rfloor$ represents the largest integer less than or equal to x, $\{T^{lk}\}$ are independent and identically distributed by time delays for user k with the uniform distribution over $[-\alpha T, \alpha T]$, $T_c$ is the chip duration time, $\lceil x \rceil$ represents the smallest integer greater than or equal to x, and $L_p^{(k)}$ is the number of resolvable paths for user k. Here, $T=NT_c$ is the symbol period. In most practical cases, $\alpha<<1$, $L_p\cong 4$, $\alpha T/T_c\cong 2$, and $L\cong 7$. FIG. 5 shows a diagram of the received signals in the suggested system.

Meanwhile, for the second selection method, L satisfies $L<N_b$ in place of $L<N_b^2$ of the condition (16).

Table 4 shows the number of users and spreading gains for the two selection methods when L=6 and 7. As known in Table 4, it is clear that the number of users are quite different depending on the selection method even if the spreading gain is almost the same.

TABLE 4

| The first selection method | | The second selection method | |
|---|---|---|---|
| Number of users(N) | Spreading gains($K_u$) | Number of users(N) | Sreading gains($K_u$) |
| L = 6 | | | |
| 111 | 11 | 110 | 14 |
| 255 | 27 | 257 | 35 |
| 561 | 61 | 551 | 77 |
| 1056 | 116 | 1041 | 147 |
| L = 7 | | | |
| 113 | 11 | 142 | 16 |
| 257 | 27 | 270 | 32 |
| 563 | 61 | 526 | 64 |
| 1058 | 116 | 1038 | 128 |

Meanwhile, a despreading sequence for user k is a similarly pattched PS sequence defined as $$d_l^{(k)} = \begin{cases} 0, & \text{if } l = 0, 1, \ldots, L-1, \\ c_{l-L,ki}, & \text{if } l = L, L+1, \ldots, L+N_s-1, \\ 0, & \text{if } l = L+N_s, L+N_s+1, \ldots, N-1. \end{cases} \quad (17)$$

Figure 6A:
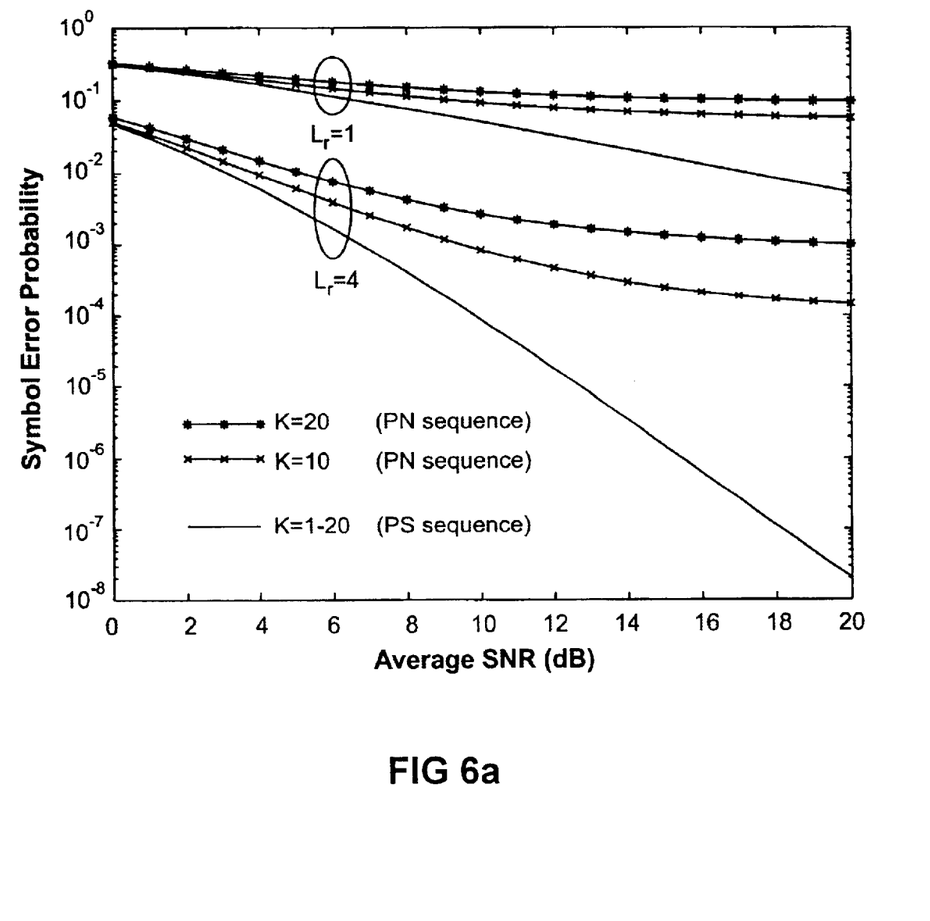
FIGS. 6a and 6b are a graph comparing the prior PN sequence with Park-Song sequence according to the present invention.
Figure 6B:
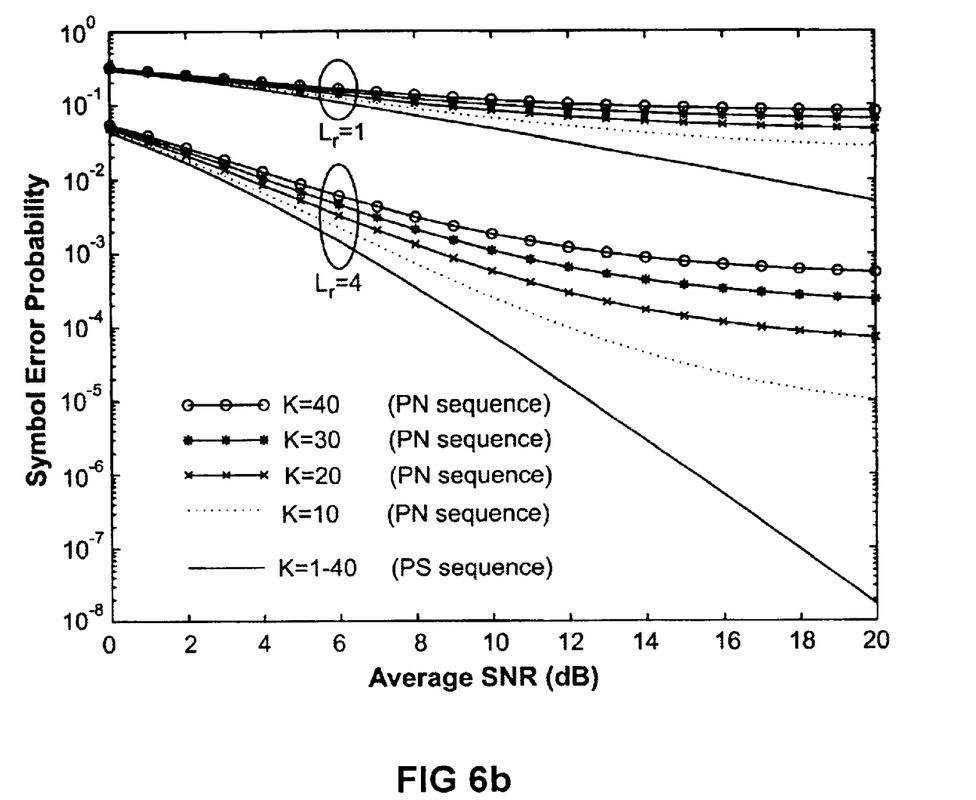

FIGS. 6a and 6b are a graph comparing symbol error probabilities of the system using the conventional PN sequence with those using the PS sequence according to the present invention. FIG. 6a is the case of the short length of sequence and p=1, $L_p$=4, $\delta$=0.2, M=2, N=194, L=7, $N_s$=180, and $L_r$=1.4, and FIG. 6b is the case of the long length of sequence and p=1, $L_p$=4, $\delta$=0.2, M=2, N=464, L=7, $L_s$=450, and $L_r$=1.4.

In FIGS. 6a and 6b, it is clear that the symbol error probability of the system using the PN sequence when the number of users increases. In addition, SNR of approximately 10 dB is required for 10 users in the case of using the PN sequence, while only SNR of approximately 6 dB is required even for 20 users in the case of using the PS sequence.

Further, the symbol error probability is not affected by the length of the sequence and the number of users in the case of using the PS sequence.

As described above, the method for allocating signature sequence using Park-Song sequence to each user in a CDMA system is capable of minimizing interference among the users and further be realized easily since the PS sequence can be obtained by only integer sums and modular operations.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for allocating signature sequence used to distinguish a particular user's signal from the other users' signals in code division multiple access systems comprising the steps of:

obtaining a k-th Park-Song sequence $\{C_{l,k}\}_{l=0}^{N_s-1}$ of length $N_s$ for k=1,2, ..., K, based upon Equation (1);

selecting a Park-Song sequence as a signature sequence $\{\alpha_l^{(k)}\}_{l=0}^{N-1}$ of length N, based upon Equation (2); and allocating the selected Park-Song sequence as the signature sequence to user k, $$c_{l,k} = \sum_{p=0}^{N_b-1} W_{N_s}^{lk} W_V^{vp} W_{N_b^2}^{lp} \delta(R(l+mp, N_b)) = W_{V_s}^{is}, \quad (1)$$

where, $W_{N_s}=e^{j2\pi/N_s}$, $W_V=e^{j2\pi/V}$, $W_{N_b^2}=e^{j2\pi/N_b^2}$, $W_{V_s}=e^{j2\pi/V_s}$, $N_s=KN_b^2$ is the length of the Park-Song sequence, V is a natural number, $N_b$ is the size of a basic complex symbol, m is a natural number less than $N_b$, $i_s=Vl(k+Kp_s)+P(\beta_{p_s})N_s$, $V_s=VN_s$, K is the maximum number of users, $p_s$ is the number satisfying $R(l+mp_s, N_b)=0$, the function P is defined by $P(\beta_p)=v_p$ when $\beta_p=W_V^{vp}$, $\delta(\bullet)$ is the Kronecker delta function, R(a,b) is the remainder when a is divided b, $\beta_p \in \{W_V^i, i=0,1, ..., V-1\}$ is a basic complex symbol, e=2.718 ... is the base of the natural logarithm, and $j=\sqrt{-1}$, $$a_l^{(k)} = \begin{cases} c_{l+N_s-L,k}, & \text{if } l = 0, 1, ..., L-1, \\ c_{l-L,k}, & \text{if } l = L, L+1, ..., L+N_s-1, \\ c_{l+N_s-L,k}, & \text{if } l = L+N_s, L+N_s+1, ..., N-1 \end{cases} \quad (2)$$

$$= c_{R(l+N_s-L,N_s),k}, \quad l = 0, 1, ..., N-1, k = 0, 1, ..., K_u-1,$$

where, L is a natural number chosen based upon the number of resolvable paths and time delay of the communication channel, $N=N_s+2L$ is the length of the signature sequence, and $K_u$ is the number of active users in the system.

2. The method according to claim 1, wherein said Park-Song sequence selecting step selects the Park-Song sequence with L satisfying the following conditions, $$\min\left\{\left\lfloor \frac{\tau^{(k)}}{T_c} \right\rfloor\right\} \geq -L, \quad k = 0, 1, ..., K_u-1, \quad (3)$$

$$\max\left\{\left\lceil \frac{\tau^{(k)}}{T_c} \right\rceil + L_p^{(k)}\right\} \leq L, \quad k = 0, 1, ..., K_u-1, \quad L < N_b^2.$$

where, $\lfloor x \rfloor$ represents the largest integer less than or equal to x, $\{\tau^{(k)}\}$ are independent and identically distributed by time delays for user k with the uniform distribution over $[-\alpha T, \alpha T]$, $T_c$ is the chip duration time, $\lceil x \rceil$ represents the smallest integer greater than or equal to x, and $L_p^{(k)}$ is the number of resolvable paths for user k, here, $T=NT_c$ is the symbol period.

3. The method according to claim 1, wherein said Park-Song sequence selecting step selects the Park-Song sequence with L satisfying the following conditions, $$\min\left\{\left\lfloor \frac{\tau^{(k)}}{T_c} \right\rfloor\right\} \geq -L, \quad k = 0, 1, ..., K_u-1, \quad (4)$$

$$\max\left\{\left\lceil \frac{\tau^{(k)}}{T_c} \right\rceil + L_p^{(k)}\right\} \leq L, \quad k = 0, 1, ..., K_u-1, \quad L < N_b.$$

where, $\lfloor x \rfloor$ represents the largest integer less than or equal to x, $\{\tau^{(k)}\}$ are independent and identically distributed by time delays for user k with the uniform distribution over $[-\alpha T, \alpha T]$, $T_c$ is the chip duration time, $\lceil x \rceil$ represents the smallest integer greater than or equal to x, and $L_p^{(k)}$ is the number of resolvable paths for user k, here, $T=NT_c$ is the symbol period.

4. The method according to claim 1 further comprising the step of generating the signature sequence as the Park-Song sequence added to the beginning and ending 'patches' of itself at both ends.

* * * * *